(12) United States Patent
Tormasov et al.

(10) Patent No.: US 8,166,565 B1
(45) Date of Patent: Apr. 24, 2012

(54) ENCRYPTION AND ACCESS METHOD AND SYSTEM FOR PEER-TO-PEER DISTRIBUTED FILE STORAGE

(75) Inventors: Alexander G. Tormasov, Moscow (RU); Vitaly A. Obernikhin, Moscow (RU)

(73) Assignee: Parallels IP Holdings GmbH (CH)

( * ) Notice: Subject to any disclaimer, the term of this patent is extended or adjusted under 35 U.S.C. 154(b) by 332 days.

(21) Appl. No.: 12/566,625

(22) Filed: Sep. 24, 2009

Related U.S. Application Data (62) Division of application No. 11/188,721, filed on Jul. 26, 2005, now abandoned.

(60) Provisional application No. 60/591,869, filed on Jul. 29, 2004.

(51) Int. Cl.
*H04L 9/00* (2006.01)
*H04L 9/32* (2006.01)

(52) U.S. Cl. ............. 726/27; 726/28; 380/277; 713/189

(58) Field of Classification Search .............. 726/26–30; 713/165–167, 189, 193–194; 380/277, 281–282, 380/284–285
See application file for complete search history.

(56) References Cited

U.S. PATENT DOCUMENTS

| | | | | |
|---|---|---|---|---|
| 6,128,605 A | * | 10/2000 | Saito et al. | ....................... 705/57 |
| 7,155,745 B1 | * | 12/2006 | Shin et al. | ....................... 726/27 |

* cited by examiner

*Primary Examiner* — Hosuk Song
(74) *Attorney, Agent, or Firm* — Bardmesser Law Group (57) ABSTRACT

A system for secure distributed data storage that uses a network, where the system includes a file stored on a plurality of storage elements that are accessible over the network. An access control list associated with the file includes a list of users with read access to the file and a list of users with write access to the file. Data representing contents of the file, metadata associated with the file, data related to functioning of distributed data storage and the access control list is available to users of the network.

33 Claims, 7 Drawing Sheets

ENCRYPTION AND ACCESS METHOD AND SYSTEM FOR PEER-TO-PEER DISTRIBUTED FILE STORAGE

CROSS-REFERENCE TO RELATED APPLICATIONS

This application is a divisional of U.S. patent application Ser. No. 11/188,721, filed on Jul. 26, 2005, which is a non-provisional of U.S. Provisional Patent Application No. 60/591,869, filed on Jul. 29, 2004, which is incorporated by reference herein in its entirety.

BACKGROUND OF THE INVENTION

1. Field of the Invention

The invention is generally related to security of data storage, and more particularly to security of data storage in a distributed network, such as the Internet. Also, the invention is related to control of access to data stored in a distributed storage system.

2. Related Art

In recent years, electronic storage of data has been moving from being stored on a single computer with a hard drive to various forms of distributed storage. Any conventional distributed storage system requires a mechanism for giving users access to the data. Therefore, the question immediately arises: what kind of access? A number of different types of access are possible. For example, a user could have "read" access to data, "write" access to data, administrative access (where the user has permission to specify which other users have access to the data, and what kind of access), etc. Depending on the operating system, the particular access control scheme may be relatively simple, or may be much more complex, for example, involving access control lists, etc. In 1983, the U.S. Department of Defense published the first access control criteria as the Trusted Computer Security Evaluation Criteria (TCSEC), more popularly known as the "Orange Book," whose current version is dated 1985. The U.S. Federal Government Criteria were drafted in the early 1990s as a possible replacement, but were never formally adopted. Other standards are also known, which are essentially directed to various implementations of access control in a distributed storage system.

The security of an operating system is conventionally accomplished through the implementation of a "trusted area," which can be modified only by those users who a priori have access to the trusted area. These trusted users, in turn, can define permissions and control access of other users to the data of the system. Thus, for example, consider the situation of a server, and of a user requesting certain information from the server. The server compares the request for the data with what it knows to be the access privileges of that user, and either fulfills the request by delivering the data to the user, or rejects the request. This is done based on some characteristics of the user, which is another way of framing the access control problem encountered by the server. At the same time, it is assumed that the server itself "exists," or "lives," in a trusted area, since if the server code were available to the public, any user could arbitrarily modify his own access control parameters, and then access any data on the server.

The fact that the server has to "live" in a trusted area implies that there exists a "someone" whose job it is to administer the security of the server. For example, there may be a person whose job it is to maintain the database of authorized log-ins into the trusted area of the server.

There are important differences between a corporate distributed network, such as a LAN or a WAN and a very large distributed network, such as the Internet. One of the most important differences is the fact that there is no single owner of the Internet. A LAN or a WAN is owned by, for example, a corporation, or is managed by an Information Technology department, which is in charge of administering security and access control for the LAN, and therefore, of the data stored on the LAN. For example, the IT department is usually in charge of adding users, deleting users, defining the access control rights of the users, etc. Because the Internet, unlike a LAN, does not have an owner, the security aspects of data storage are considerably more complex.

On the Internet, the access control problem is usually solved in a different manner. The user (typically using a client, such as a web browser) declares certain information about himself. This information is transmitted to a webserver, which in turn decides whether this particular user has access, and to what data. A log-in is the most common way of accomplishing access control to non-public data on the Internet.

However, the only reason that the webserver can know whether a particular user has, or does not have, access to restricted data is because someone previously "told" the server that this particular user has access. As noted above, that "someone" does not own the Internet, and does not own most of the nodes through which the information between the user and the server has to be transmitted. This problem exists for any decentralized distributed system that does not have a single owner.

The security requirements for the routers between the client and the webserver are relatively weak. Usually, the only requirement is that the router be able to transmit data formatted in the TCP/IP protocol. In other words, in the highly decentralized network example of the Internet, it is impossible to insist on security of the transmission path between the client and the server, and therefore impossible to assure that information relating to access control will remain secure.

SUMMARY OF THE INVENTION

Accordingly, the present invention is related to an encryption and access method and system for peer-to-peer distributed file storage that substantially obviates one or more of the disadvantages of the related art.

In one aspect, there is provided a system for secure distributed data storage that uses a network that includes a file stored on a plurality of storage elements that are accessible over the network. An access control list associated with the file includes a list of users with read access to the file and a list of users with write access to the file. Data representing contents of the file, metadata associated with the file, data related to functioning of distributed data storage and the access control list is available to users of the network.

Access control policy to unencrypted data in the file is enforced on the client side. The file can be stored in an encrypted form, and/or in a signed form. The data related to functioning of distributed data storage includes metadata of storage elements that are associated with file. The system can also include means for writing to the file by users with write access; and means for reading the file by users with read access. At least one encryption key is associated with the file and is used for encrypting the file. At least one decryption key associated with the file and used for decrypting the file.

The file can have multiple revisions, and at least two of the revisions can have different encryption and decryption keys. Alternatively, every revision can have the same encryption and decryption key. A verification key pair is used for verifying integrity of data in the file. A key for generating verification data of the verification key pair is associated with the file and is accessible to a user with write access.

A key for checking verification data from the verification key pair is accessible to users with read access. A directory can have at least one of the following: a path to storage elements associated with the file; a file identifier; the access control list; a file's symbolic name associated with the directory and with the file identifier; file metadata; and file history data. The directory is accessible to users of the network. Alternatively, a path to the directory is provided to users of the network.

An owner identifier of the file is stored in the directory. The owner identifier identifies a user who can change the access control list. The file can have more than one owner identifiers. File history data can include historic versions of file. The network can be a peer-to-peer network. Users of the network have unrestricted access to content of distributed data storage that represents data in the file, have unrestricted access to the access control list, and have unrestricted access to one of: a path to storage elements associated with the file; a file identifier; a file's symbolic name associated with the directory and with the file identifier; file metadata; and file history data.

The users on the access control list can access the file using, e.g., trusted client software.

In another aspect, a system for secure distributed data storage includes a file stored on a plurality of storage elements; an access control list associated with the file; a list of users with read access to the file stored in the access control list; a list of users with write access to the file stored in the access control list; a public key associated with each user and used for encrypting information for accessing the file; a private key associated with each user for decrypting the information for accessing the file; a public key associated with the file and used for encrypting the file; and a private key associated with the file and used for decrypting the file.

A private key is associated with the file and used to generate a digital signature for write access to the file. A public key associated with the file and used to verify the digital signature of the file. A private key is associated with each user and used for generating a digital signature for write access to the file. A public key is associated with each user and used for verifying the digital signature. A directory has stored in it a file identifier corresponding to the file and the access control list, and optionally a public key for verifying a digital signature for the access control list, and a file identifier corresponding to a file that contains the access control list. Each user can have an identifier stored in the directory, and wherein the identifier is used to identify an owner of the file who can change the access control list. There is no central control of access to the file, and access to the file is enforced on a user's side.

In another aspect, a computer program product for secure distributed data storage is provided, the computer program product including a computer useable medium having computer program logic recorded thereon for controlling at least one processor. The computer program logic includes computer program code means for storing a file on a plurality of storage elements; computer program code means for generating an access control list associated with the file; computer program code means for storing a list of users with read access to the file in the access control list; computer program code means for storing a list of users with write access to the file stored in the access control list; for each user, computer program code means for generating a public key that is used for encrypting information for accessing the file; for each user, computer program code means for generating a private key that is used for decrypting the information for accessing the file; for the file, computer program code means for generating a public key that is used for encrypting the file; and for the file, computer program code means for generating a private key that is used for decrypting the file.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Table of Contents 1.0 Introduction
2.0 Access Control in Peer-To-Peer Networks
3.0 Structure Of A Distributed Peer-To-Peer File System
4.0. Protection Of Information
   4.1 Requirements for protection of information
   4.1.1 Functionality
   4.1.2 Access control
   4.1.3 Data integrity and authenticity control.
   4.1.4 Protection of private information.
   4.1.5 Untraceability
   4.1.5 Untraceability of the storage of information.
   4.2 Ensuring file system operability
   4.2.1 Notation
   4.2.2 Files
   4.2.3 Structure Of The Directory
   4.2.4 Structure of ACL
   4.2.5 Root Directory
   4.2.6 Examples Of Basic Operations In The System.

4.2.7 File Reading With Known FID and ACL
4.2.8 File modification With Known FID and ACL
4.2.9 Reading And Modification Of The Directory With A Given FID and ACL
4.2.10 Reading The Directory When The Path To It Is Known
4.2.11 Creation (Writing) Of A New File
4.2.12 Deleting Files
4.2.13 Authorization To Read The File (Directory)
4.2.14 Permission To Write To The File (Directory)
4.2.15 Denial Of Writing/Reading Privilege To The File (Directory)
4.2.16 Change User Key
4.2.16 User Groups
4.2.18 Enforcing Defined Access Control Rules
4.2.19 Authentication Of The Users Of The System
4.2.20 Protection Of Private Information
4.2.21 Untraceability
5.0 Access control with change logs
6.0 Access control scheme that includes an "owner"
7.0 Conclusion

1.0 INTRODUCTION

The problem to be addressed can be framed as follows: how to administer access control in a distributed system where "ownership" of the system is impossible? The description below shows one of a number of possible implementations. Note that a particular case of a distributed data storage is a distributed file system, although it will be understood that the invention is not limited to storage of files, but is more broadly applicable to storage of data in any number of formats.

A useful analogy to consider is the concept of a number of safety deposit boxes in a bank, arranged in a wall. A user can walk up to the wall and point to several of the boxes, saying "these boxes belong to me, and I will store my data in these boxes."

However, the wall in which the safety deposit boxes are located is owned by the bank. Therefore, the bank, if it wanted to, could (in theory) gain access to the safety deposit boxes identified by the user, and therefore, gain access to the data stored inside. It is the bank that gives to the user keys to the safety deposit boxes. From that point on, it is the user's responsibility to guard the safety of the keys. The user can keep the keys, can give them to others, can send them to others by mail, etc. In other words, the security of the data stored in the user's safety deposit boxes depends on the user himself, on how well he protects the keys, and on how much he trusts the bank.

Thus, it is desirable to create a construct that is logically "located" above the Internet, such that any user can create such "safety deposit boxes" where his data is stored. Thus, the user, and only the user, controls how and to whom the keys are distributed, without the concept of a "super-owner" (the bank that owns the safety deposit boxes).

In order to create such a decentralized distributed storage system, at least two conceptual constructs are required: servers (storage elements), on which the data is actually stored, and clients, who access the data based on certain parameters that they declare about themselves. Note also that although the description above and the algorithms that follow below is primarily in terms of the client-server model as it applies to the Internet and to webserver-client interaction, the storage elements of the distributed storage system need not be webservers. The storage elements can be ordinary computers, disk drives and arrays, RAIDs, storage area networks, networks of networks, etc.

The clients must have the ability to contact the servers, and to declare certain information about themselves to the servers. (A conventional example of such declared parameters is user name and password (authentication information), which are given to the user by an owner of a certain resource and which are used for authorization of access (access rights).)

An alternative way of approaching the problem is for the client to declare items of information that the client "knows," and, based on these items of information, the server will decide whether or not this client has access to the data. The point to note here is that this is done without an intermediary (i.e., without a "system administrator" who creates user accounts and grants to the users their rights). In other words, access is based solely on what the user (typically a client in the client-server model) declares about himself. This implies that the requirement of having a trusted area on the server for managing access to the data can be omitted. Any intruder can gain access to the server, but cannot access the data, notwithstanding the fact that there is no trusted area on the server that manages access. The responsibility for protecting the security of the data therefore rests entirely with the client, not with the server. In practical terms, the responsibility for protecting the security of the data rests with the user in so far as he is able to protect his own computer, whether physically, through passwords, through firewall mechanisms, or through some other forms of security. Thus, in this model, the client is treated as being secure, while everything outside the client (e.g., the servers on which data is stored) is treated as being un-secure. The sole function of the servers, in this model, is to provide the service of storing the data. The servers themselves do not know what the data is and do not control authorization to access the data.

The discussion below illustrates one approach to implementing the model described above, that uses cryptography. In this particular example, cryptographic primitives are used to implement a distributed storage system that does not have a single owner of access, such as a system administrator, other than the client itself, who owns the data. Also, the discussion below shows mathematically that the approach described therein is, in fact, secure, even when the data storage services provided by the multiple servers are themselves available to the public.

Furthermore, in addition to moving the security aspects of the storage from the server to the client, the approach described herein allows an unlimited expansion of the secure storage network (for example, in the form of a peer-to-peer network), notwithstanding its decentralization. In other words, any client (or any computer) can connect to the network, and act as a storage element of the network, thereby allowing its resources to be used for storage by others. This permits a user to collect fees through appropriate mechanisms for making his computer resources available to others (in a sense similar to the "SETI at home" program, where multiple computers connected to the Internet are used for processing small "chunks" of data received from NASA's SETI program). In other words, the client computer can connect to the Internet, and act as a server (storage element). Also, a server already connected to the Internet can act as a storage element of a distributed storage system in this context. Thus, it will be appreciated that the term "server" here is intended as a logical construct that provides certain services to clients (and/or users), typically over a network. It is also possible that the server (as a logical construct) is physically located on the same physical computer as the client.

The security of the overall distributed storage system is based on the security of the cryptographic primitives, and other than the clients themselves, there is nothing that needs to be protected or placed in a secure, or trusted area. If a server is being added as a storage element to the network, there is no need to ensure that the server is protected against hackers, against viruses, or even against the fact that the owner of the server is able to see what data is stored on the server.

One embodiment, as described below, uses the concept of cryptographic access control lists to implement the distributed storage system. The cryptographic access control lists define how one client can be distinguished from another client. Each client, if he wants access to the data, needs to declare a sufficient number of cryptographic keys in his possession in order to have access to the data. Failure to do so will result in the client's inability to access (or meaningfully decrypt the data).

Also, public key infrastructure (PKI) can be used, although the invention is not limited to this implementation.

The approach is applicable to virtually any aspect of data storage. For example, it is applicable to storing information in a person's "mail box." In other words, senders can send email to one user, who in turn can store the emails on the distributed storage system, with such a storage being secure notwithstanding its distributed nature.

Upon placing the data in distributed storage, the owner of the data can, for example, tell everyone "here is the data, you can now access it" (for instance, by associating the data with a URL). In other words, all that is needed in this case is disclosing the address (using the safety deposit box analogy, telling everyone "that this particular box contains the data you are looking for" and that it is available to anyone). Note also that unlike the conventional approach, where access to a particular webserver can be compromised (e.g., denial-of-service (DOS) attacks on the Microsoft servers, or using other forms of attacks either against the server, or against the communication channel to the server), this approach is much less susceptible to that type of threat, because the nature of the data storage is decentralized and distributed. There is no single point where the distributed data storage system is critically vulnerable. Either the entire distributed data storage system needs to be taken down, or a very large number of storage elements that store the data of a particular user needs to be taken down. Thus, this approach is more robust than a single webserver storing data (even a single "secure" webserver), and which has a number of points of critical vulnerability.

The description below is directed to one embodiment of the invention, although it will be understood that the invention is not limited to this embodiment. This embodiment describes version of a crypto-based ACL (access control list), where data containing signatures of users and ACL data is distributed and incorporated into metadata of stored files, thus effectively becoming a part of file, and introduces an owner of the file as a separate "instance." In alternative embodiments, a different approach can be used, where the ACL is stored in different locations, and can refer to known public key infrastructure (PKI) data or a separate base of users' information (e.g., keyring servers in PGP ("pretty good privacy")). In such a case, secure integration of ACL data with file content should be guaranteed in such a manner that it should in no way remove or change the ACL or signatures without appropriate permissions. This can be done either by introducing of concept of file owner or without the concept of the file owner.

2.0 ACCESS CONTROL IN PEER-TO-PEER NETWORKS

Figure 1:
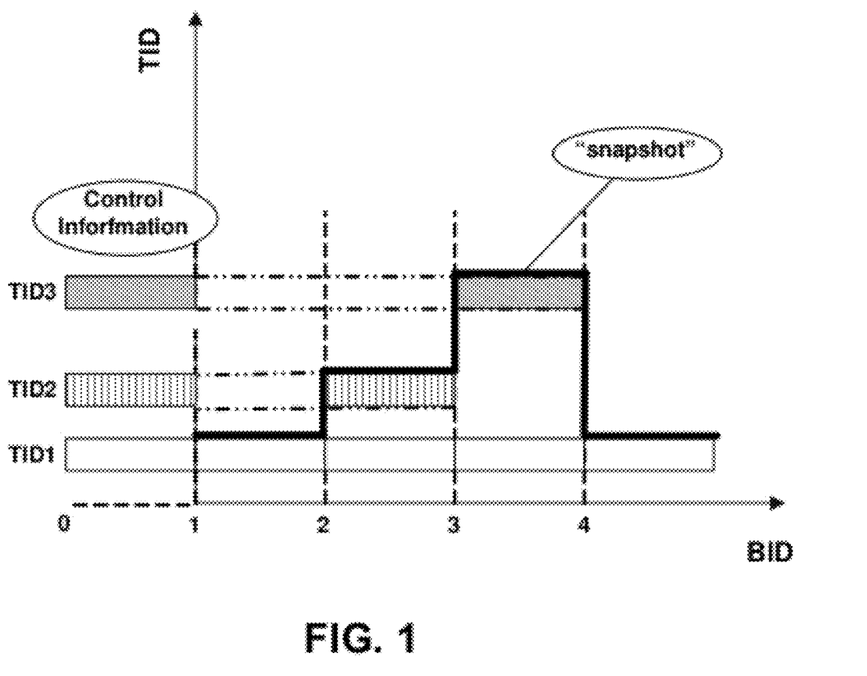
FIG. 1 illustrates how transactions and snapshots can be used to modify a file.

FIG. 1 illustrates how transactions and snapshots can be used to modify a file. Such distributed peer-to peer file systems represent a new and rapidly developing branch of modern computer systems. A question arises regarding providing control of access to the information stored in a distributed file system. Distributivity and fail-safety in a peer-to-peer system implies the option of storing data not only on the user's computer, but on other computers as well, because otherwise the files on user's computer (after the computer is switched off), become inaccessible. In the absence of a safe center that is able to control the access to the data, the problem of controlling the access can be solved by passing it to users' computers. If the user trusts only software installed on his own computer, then storing files to which he wants the access to be limited, on other computers is impossible without cryptographic means. Available peer-to-peer file systems (e.g., FreeNet, see http://freenet.sourceforge.net, OceanStore, see http://oceanstore.cs.berkeleyedu, and Farsite, see http://rescarch.microsoft.com./sn/Farsite) have different schemes for encryption and distribution of keys, depending on objectives stated at the time of creation of the systems. Here, construction is presented of cryptographic control of access to a distributed file system described in M. A. Khasin, *Model of distributed data storage in a global network*, Ph.D. Thesis, available at the library of Moscow Institute of Physics and Technology (2001); K. R. Pakulin, *System of distributed data storing on the Internet*, Optimization of algorithms of a server for client servicing and local storage of data, Proceedings of the First International Conference on Virtual Environment Systems on clusters of personal computers, pp. 160-182, Protvino (2001); R. Yu. Ilyin, *Server for supporting a topology of a distributed file system TorFS*, Proceedings of the First International Conference on Virtual Environment Systems on clusters of personal computers, pp. 138-159, Protvino (2001); all incorporated by reference herein.

3.0 STRUCTURE OF A DISTRIBUTED PEER-TO-PEER FILE SYSTEM

The structure of a distributed peer-to-peer system is described in detail in the citations above. As far as the data security is concerned, the following features of the system are of importance:

(a) Notwithstanding the fact that each user of the system has his (her) unique identifier, in practice, the users differ from each other only in that they know two keys, that is, "public key/secret key" necessary for encryption/decryption of information—or they do not know these keys. Accordingly, if both keys for different users coincide, then such users are indistinguishable to the system.

(b) Each file in the system has an identifier (FID). A directory service in the system carries out the function of transformation of the symbolic path to the file to the FID.

(c) The files are being written to the system as blocks. Each block has its identification number that is unique within its file. The blocks are divided into smaller parts (slices) which are saved with a redundancy given by the user—the threshold (N,k) scheme is being used. (It is assumed that the reader is familiar with (N,k) storage schemes.) Generally, different slices are stored on different computers. Note that the system is not a distributed block system, in other words, it works at the file level rather than at the block level. The blocks are introduced only for optimizing the performance of the system.

(d) Since changing a file implies changing of the blocks and slices on different computers which (possibly) are not always connected to the network, the blocks written to the system are immutable. A BID (block ID) of each block, in addition, bears an identifier of a transaction (TID, or transaction ID). A transaction is a unit of change of the file content. The transaction consists of blocks changed as a result of performing this transaction. The list of changed blocks, together with other control information is stored in the zeroth block of the transaction. When a changed file is being written to the system, new blocks are being written to the system corresponding to changed parts of the file. An identifier of a new transaction is being assigned to the blocks. The identifier of the transaction depends on time; in other words, the system implements ordering file transactions by time (TSO—timestamp ordering).

(e) When searching for a file in the system, the user defines the time range for modification of the file or makes a request for the latest version of the file in the system. For the file to be assembled, a "snapshot" has to be previously assembled. The snapshot represents the state of the file at the moment of recording the transaction with a given TID. The snapshot includes not only those blocks whose TID is equal to some predetermined ones. A snapshot of the file (thick line in FIG. 1) related to the transaction TID3 is shown in the FIG. 1. The second block of the file was changed in the course of recording the TID2 transaction, the third block, in the course of recording the TID3 transaction.

Blocks of different transactions simultaneously exist in the system until the blocks of the older transaction are deleted by a "garbage collector." Before deleting the blocks of the oldest transaction of the file, the garbage collector makes sure that the file can be assembled in full without them. Also, when a large number of transactions relating to the same file is found, a snapshot of the file related to the last transaction can be assembled, after which the recording of a new transaction (including all the blocks of this file) is performed. Thus, all blocks of the file are "glued" together. After that, the old transactions relating to the file may be deleted by the garbage collector.

4.0. PROTECTION OF INFORMATION

4.1 Requirements for Protection of Information

Requirements for protection of information in the distributed file system are listed below, in sections 4.1.1-4.1.6.

4.1.1 Functionality

The system must function notwithstanding the absence of trust to the software of the distributed file system itself, which runs on a non-local or remote computer. The access control shall be provided on the hypothesis that each user trusts only the software working on his local computer. Any other file/directory/cache on the server of the system might potentially belong to a "violator."

4.1.2 Access Control

Provision must be made in the system to enable access to the files/directories only for certain users.

4.1.3 Data Integrity and Authenticity Control.

The system must control the integrity and authenticity of its data.

4.1.4 Protection of Private Information.

The system must not allow anyone to analyze information read from or saved to the system by a user.

4.1.5 Untraceability

They system must enhance untraceability of users requesting some kind of information in the system. For example, the system shall not allow the owner of the file/directory or of the computer wherein a part of certain file (directory) is stored, to track the users requesting this file in the system.

4.1.5 Untraceability of the Storage of Information.

The user shall not be able to track the location of a given file.

4.2 Ensuring File System Operability

As a consequence of requirement 4.1.1, a single server cannot be used in the system for all the access control. Instead, cryptographic means to control the access is implemented, and, in reality, the access control is shifted to the local computer of the user.

All the file content and some of the auxiliary (control) information should be subject to encryption. Two pairs of "public key/secret key" are generated for each file: one for encryption, the other for electronic digital signature. (Also, instead of using two pairs of keys for each file, it is possible to use one pair of keys for encryption/decryption of the file. In this case, the electronic digital signature (EDS) created by the users who are permitted to write to the file is used for integrity control. In addition, one might not generate even the pair of keys for encryption/decryption of the file and to encrypt the transaction key by public keys of users having a permission to read the file.) Such a scheme with two pairs of keys can be referred to as an "anonymous" one, because after recording to (modification of) the file, the information on identity of the user who changed the file is absent. To carry out the read access, it is necessary to know the public key to check the signature on the file and to know the secret key to decrypt the file. For write access, on the other hand, it is necessary to know the public key to encrypt the file, and the secret key to generate an electronic digital signature (EDS). The corresponding keys must be stored somewhere and accessible for authorized users.

As a result, a problem of distribution of keys arises. This problem is solved by means of access control lists (ACL) where the information on keys necessary to access the file is encrypted by the users' public keys.

Nevertheless this is only a simplified approach to the architecture of access control system. Since asymmetric cryptographic systems work approximately 3 orders of magnitude slower than the symmetric ones, the encryption/decryption of the files has to be performed by the "transaction key" (session key) using symmetrical encryption, and the proper key of the transaction has to be encrypted by means of asymmetrical encryption.

4.2.1 Notation $U_i$—identifier of a user associated with his public key $K_T$—"transaction key"—a secret key for symmetric encryption. The key is generated by means of random number generator for each transaction of the file.

$Pub_F$—a public key for encryption of file F.

$Priv_F$—a secret key for decryption of file F.

$Vk_F$—a public key used for verification of EDS for file F.

$Sk_F$—a secret key used for generation of EDS for file F.

$Pub_{U_i}$—a public key of the user $U_i$ used to encrypt the information for the user $U_i$.

$Priv_{U_i}$—a secret key of the user $U_i$ used to decrypt the information.

$File1_{enc} = E_K^{symm}(File1)$—file File1 encrypted by a symmetrical encryption algorithm using key K.

$File1 = D_K^{symm}(File1_{enc})$—file File1 decrypted by a symmetric encryption algorithm using key K.

$File2_{enc} = E_{PubK}^{asymm}(File2)$—file File2 encrypted by an asymmetric encryption algorithm by means of a public key PubK.

File2=$D_{PrivK}^{asymm}$ (File2$_{enc}$)—file File2 decrypted by an asymmetric encryption algorithm by means of a secret key PrivK.

$S_F$=Sign$_{Sk}$(F)—the EDS created by the key Sk for the file F.

Check$_{Vk}$($S_F$)—checking of the EDS of $S_F$ by means of the key Vk$_F$.

$H_F$=Hash(F)—Hash function value of the file F.

Vk$_{RootDir}$—a public key used for checking the EDS of the root directory.

Sk$_{RootDir}$—a secret key used for generation of the EDS for the root directory.

4.2.2 Files

Each file in the system has a unique file identifier (FID). The directory record related to a given file (see below) includes an access control list ACL (see below) which includes couples of "a public key/a secret key" for encryption/decryption of a given file (Pub$_F$/Priv$_F$) and checking/generation of the EDS of (Vk$_F$/Sk$_F$).

Figure 2:
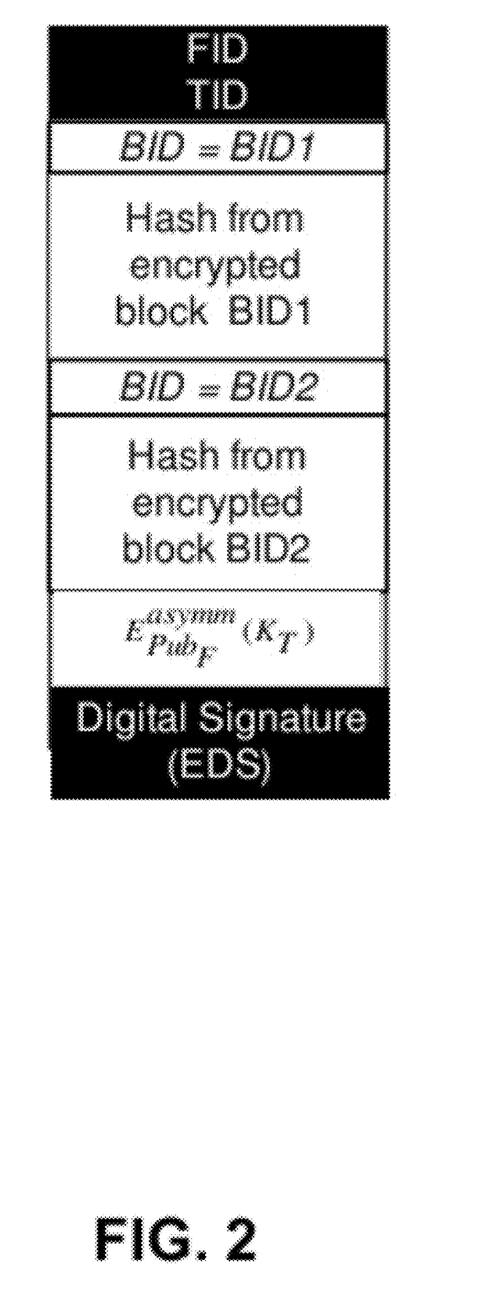
FIG. 2 shows how transactions fit into the access control scheme.

The zeroth block contains control information, in particular, TID, list of blocks changed by this transaction as well as Hash function values list of cyphertexts of the blocks of the file. The authenticity of the control block is guaranteed by means of the EDS created by the key Sk$_F$. The zeroth block is stored in an open (publicly accessible) form, as shown in FIG. 2.

The blocks of transaction are encrypted by "transaction key" $K_T$ (session key), and a new one is generated for each transaction. Each block of the file is identified by means of two numbers: BID and TID.

Thus, in order to reconstruct the file on the local computer, the user must assemble the snapshot (see FIG. 1, which illustrates how transactions and snapshots can be used to modify a file) and check the authenticity of the blocks of the file, after which the user decrypts them and obtains the file.

4.2.3 Structure of the Directory

Figure 3:
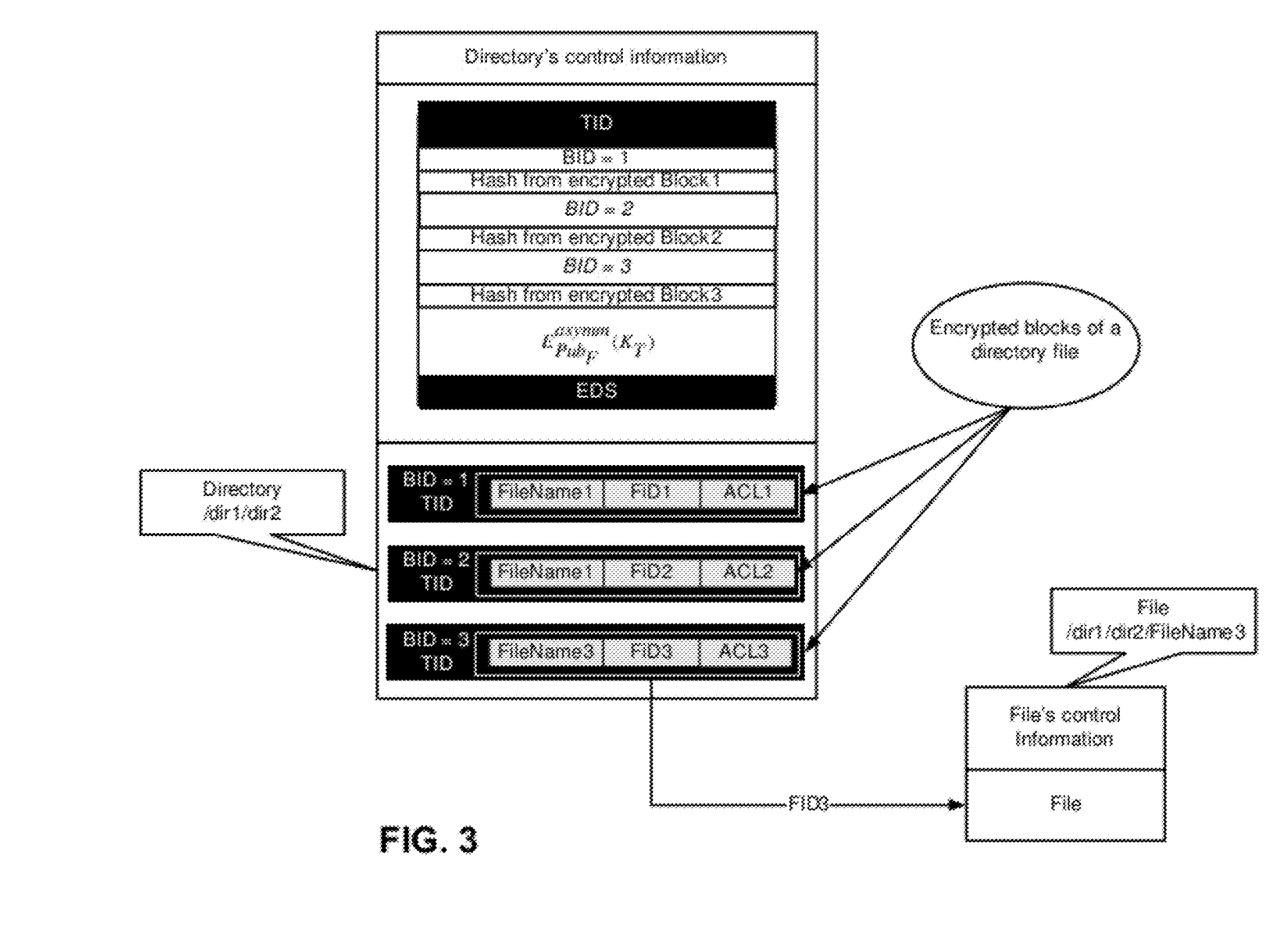
FIG. 3 shows how directories fit into the access control scheme.

The directories are intended for mapping of the text path to the file and the FID. The content of the directory is stored as a file, as shown in FIG. 3 (see also section 4.2.2). The file of the directory consists of records of the "FileName|FID|ACL" type, that is, the ACL lists for files are stored in the directory records related to a given file. Each record represents a separate block of the directory file that contributes to atomicity of operations of adding/deleting directory records.

Directory records (blocks) added/modified in result of a single transaction are encrypted using the key of this transaction.

4.2.4 Structure of ACL

Figure 4:
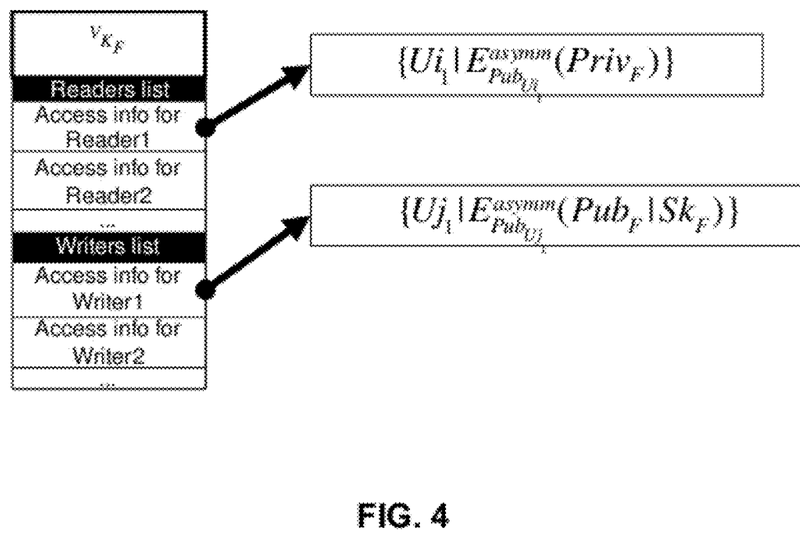
FIG. 4 shows how public and private keys are used for file access in an "anonymous" file access scheme.

The control of access to the file is carried out by means of two pairs of keys—one pair for encryption and one pair for signature. The access control list includes file access keys that are encrypted with public user keys, which authorize reading and writing to the file, as shown in FIG. 4.

The key for verification of the signature in the zeroth blocks of transactions is stored in the cleartext (plaintext). It offers an opportunity for the components of the system to check the validity of the file blocks stored in the system. This also makes sense from the viewpoint of optimization of the ACL size, since there is no need to encrypt this key separately for each user who is allowed to read from this file.

Since the same information is encrypted by public keys of different users, a need arises to use randomization or cryptosystems with a public key, where the randomization is the basis of the construction (for example, the El-Gamal's cryptosystem (see El-Gamal, T.: *A public key cryptosystem and a signature scheme based on discrete logarithms*, IEEE Trans. Inform. Theory 31 (1985), pp. 469-472).

The ACL could be modified by users authorized for writing to directory where the directory record with the given ACL is located. An alternative is possible where only users from special lists are allowed to modify the ACL.

| Primary file content | Sk$_F$ | Pub$_F$ | Priv$_F$ | Result |
|---|---|---|---|---|
|  |  |  |  | The file content of a new transaction (if the file is not empty) by no means is related to file content of the preceding transactions. The situation is equivalent to deleting the old file and recording a new one under the same name. The user enjoys complete control over the received file. |
|  | + | + |  | If the user won't change the key Sk$_F$ then the old transactions of the file hold valid. The user is authorized to write into the given file, that is, he can upgrade the existing transactions. |
| + |  |  |  | The user can completely change both couples of keys to the given file and to write a new file transaction with content identical to that of the last transaction before the ACL had changed. |
|  |  |  | + | If the user knows the key for file decryption (of the keys of transactions) he gets the content of the file after which the situation amounts to the preceding one |

As may be seen from the above table, the privilege of writing into the directory is "unsafe" enough, and it must be given to the users very carefully, because a user who knows the content of a file can gain complete control of it. If he does not know the content of the file, the user may gain complete control over the "new homonymous version" of the file (in practice, he can delete the old file and create a new one with the same name).

4.2.5 Root Directory

For the root directory "/", the FID is predefined and the ACL is absent. There is a special key Vk$_{RootDir}$ in the system known to all its users which is used to control the authenticity of the root directory transactions. The administrator of the system, and only he, knows the corresponding secret key Sk$_{RootDir}$. The root directory content can be read by any user, but writing to the root directory may be performed only by the administrator of the system.

4.2.6 Examples of Basic Operations in the System.

Details of basic operations may be found in the "Model of distributed data storage in a global network" by M. A. Khasin, cited above. In the discussion below, only some aspects of operations are discussed, where they are modified with regard to access control mechanism. The user is presumed to be authorized to perform the operations.

4.2.7 File Reading with Known FID and ACL

In order to read the file, the user has to request a file with a given FID. The user either indicates a specific transaction (version) of the file or the most recent one. Using the key Vk$_F$, he checks the EDS of the zeroth blocks gotten on request, after which he computes the necessary snapshot of the file and requests the blocks with the necessary BID and TID. After obtaining the requested blocks the user compares the values of Hash-functions of encrypted blocks with the values in the zeroth blocks. If the values coincide, then the authenticity is proved. After that, it is necessary to decrypt the blocks, each of which is encrypted by the key of its transaction. If the user is authorized to read the blocks, then the ACL of the given file contains the $Priv_F$ key. The user decrypts the $K_T$ keys of the transactions contained in the zeroth blocks and decrypts the obtained blocks of the file snapshot.

In order to be able to read the content of the file, it is necessary and sufficient for the user to have "read" privilege to the file (the user must know the key $Priv_F$). Since the blocks of transactions are encrypted by the key $K_T$ of the transaction, then, in order to decrypt them, the user must know the key $K_T$. The transaction key is encrypted with a public key of the file, and therefore the user must know the secret key of the file $Priv_F$.

It is assumed that "strong" cryptosystems are used here: in order to read an encrypted text, a key for decrypting must be known; it is impossible to find the secret key knowing a public one—for an asymmetric cryptosystem or a EDS system, it is impossible to find a collision for a cryptographic hash-function, and it is impossible to generate a valid EDS for a document not knowing appropriate secret key, "Write" privilege to a file does give "read" privilege to the file. A user has "write" privilege to the file. This means that he knows the values of the keys $Pub_F$ and $Sk_F$. "Read" privilege implies that the user knows the value of the key $Priv_F$. Using the public key $Pub_F$, it is impossible to find the secret key $Priv_F$.

4.2.8 File Modification with Known FID and ACL

As the user writes a new transaction relating to an existing file, he does not have to make a record into the directory containing this file. The user randomly generates the transaction key $K_T$, encrypts the blocks of transaction using this key and calculates the value of the Hash-functions for each of the blocks. After that, the list of block identifiers (BID) of the transaction blocks and the values of the hash-functions of the encrypted blocks are placed in the zeroth block of the transaction, together with the key $K_T$, encrypted by the key $Pub_F$. The zeroth block is signed by means of $Sk_F$. The encrypted blocks of the file are being written to the system, after which the zeroth block is written.

If a user does not have "write" privilege to the directory containing a file, then, in order to write a valid transaction to the file, it is necessary and sufficient to have "write" privilege to this file. For the transaction to be valid, an EDS of the zeroth block of the transaction has to be generated. It follows that the key $Sk_F$ should be known. Since the user does not have a write access to the directory containing the file, he is not able to modify the ACL and change the key $Sk_F$. Therefore, the user must know the $Sk_F$. Since it is contained only in the ACL (in the list of users having "write" privilege to this file), the user must have this privilege.

If a user does not have a "write" privilege to the directory containing the file, then the "read" privilege does not allow him to write to the file.

Since the user does not have "write" privilege to the directory containing the file, he is not able to modify the ACL and to change the key $Sk_F$. Therefore, the user must know the $Sk_F$. If the user has the "read" privilege to the file, then he knows the key $Priv_F$. In addition he knows the key $Vk_F$, since $Vk_F$ is stored in the cleartext in the zeroth block of the file. Using the secret key $Priv_F$, the user may be able to find the public key $Pub_F$. Nevertheless, it is impossible to find the key $Sk_F$ for the EDS generation with the aid of a public key $Vk_F$, which is used for verification of the EDS.

4.2.9 Reading and Modification of the Directory with a Given FID and ACL

The directory is stored in the system as a regular file. Therefore, reading and modification of the directory proceeds as described in sections 4.2.7 and 4.2.8.

4.2.10 Reading the Directory when the Path to it is Known

Figure 5:
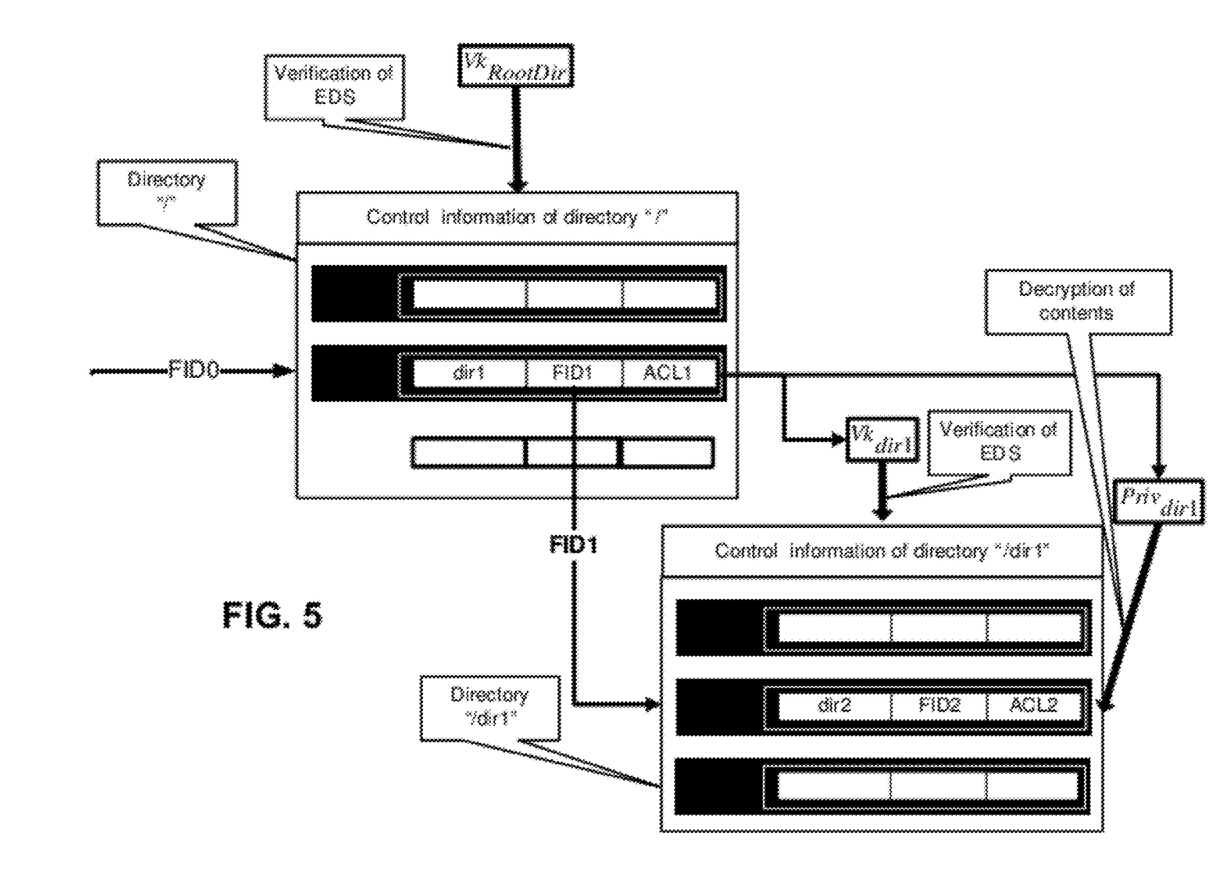
FIG. 5 shows directory read and write access fits into the access control scheme in the "anonymous" file access scheme.
Figure 6:
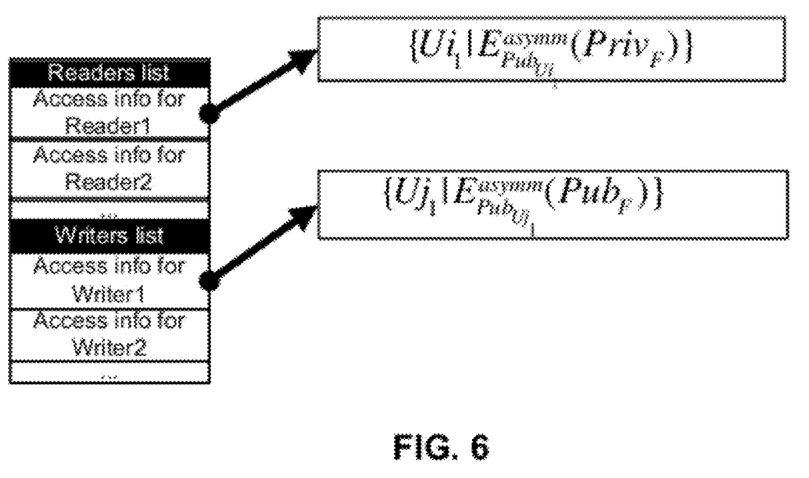
FIG. 6 shows how public and private keys are used for file access in the file access scheme that uses change logs.

Suppose the user needs to read the content of the directory /dir1/dir2/dir3/dir4. For this purpose, the user has to first restore, on his computer, the file of the root directory "/", whose FID is predefined for the system. All the users of the system know the key $Vk_{RootDir}$, so the user is able to check it, with the aid the EDS (in the zeroth block) of the root directory. Since the root directory is available for reading to everyone, the user reads the FID and ACL for the directory dir1, as shown in FIG. 5.

Suppose the user has the read access the directories dir1, dir2 иdir4 but does not have the read access the dir3. The user checks the EDS of the dir1, decrypts the content of the dir1, and gets FID and ACL for the directory dir2. After that he checks the EDS of the dir2, decrypts dir2, and gets FID and ACL for dir3. But the user does not have read access dir3, and therefore he cannot decrypt the dir3 and get the FID and ACL for dir4.

Thus, to obtain FID of the directory or of the file in the given path, the user must have read access to all the directories in the path.

4.2.11 Creation (Writing) of a New File

To create a new file, the user needs to:

(a) generate a FID and create an ACL for the given file; and (b) modify the content of the file of the directory wherein the user places the given file (to add therein a record with the name, FID and ACL of this file); and (c) place the transaction of this file in the system Thus, the right to create a file is, in practice, the write access to the directory where the file is located.

4.2.12 Deleting Files

In order to delete the file, it is necessary to modify the directory containing the file—that is, to delete the record on this file. In other words, the right to delete the file is the write access to the directory wherein the file is placed.

4.2.13 Authorization to Read the File (Directory)

A user who has the read access to the file (who knows the key $Priv_F$) and the write access to the directory that contains the file may give read access to the file to another user ($U_i$). The record $$\{Ui_1 | E_{Pub_{Ui_1}}^{asymm}(Priv_F)\}$$

must be added to the readers' list of the ACL for this file (see FIG. 4). Since the ACL is located in the file of the directory, the modification of the directory is necessary for modification of the ACL. In other words, it is necessary to have write access to the file of the directory.

In order to give the read access to the file (for current and subsequent transactions) to another user, it is necessary and sufficient to (a) have the read access for this file or to know its content; and (b) have the write access to the directory containing the file.

The necessity to have the write access to the directory is obvious, since the user has to modify the ACL contained in the directory. If the user is not changing the keys of access to the file, the necessity to have the key for reading the file is obvious too. The situation with changing the file access key is considered in section 4.2.4.

4.2.14 Permission to Write to the File (Directory)

The user who has write access to the file (that is, who knows the keys $Pub_F$/$Sk_F$) and has write access to the directory where the given file is contained) can permit another user to write to the given file, if he adds an appropriate record to the writers' list in the ACL of this file.

In order to give the write access to a given file to another user with the unchanged file access keys, it is necessary and sufficient to:

(a) have the write privilege to this file; and (b) have the write privilege to the directory containing the file.

This is analogous to section 4.2.13. Nevertheless, the user having the write privilege to the directory where the file is located may completely change the file access keys and generate a new ACL. This situation is discussed in section 4.2.4.

4.2.15 Denial of Writing/Reading Privilege to the File (Directory)

There is no explicit denial of read/write operations. A user may or may not have the write privilege /read privilege. If it is necessary to revoke the user's write/read privilege, then two pairs of keys of the file, namely, the keys ($Pub_F$/$Priv_F$) for encrypting/decrypting and for EDS checking/generation should be changed. Change of the ACL and deletion of the record for a given user from the writers/readers list is not enough, because the user could keep the keys for the given file. If the file access keys are changed it is necessary to store a new transaction containing all the blocks of the given file, because after changing keys, the previous file transactions become invalid.

4.2.16 Change User Key

The change of user key involves the change of all ACLs, where the records for a given user (in the readers/writers lists) are contained.

4.2.16 User Groups

A user group can be introduced as an example of a user, with a pair of keys. Accordingly, the user is a member of a group if he has the secret key of the group. The basic problem of this approach is the necessity to change the keys of the group if a user leaves the group (see the previous section).

4.2.18 Enforcing Defined Access Control Rules

The discussion below illustrates how the access control rules to the information stored in the system are implemented. Let us consider a situation where the user wrote the file /dir1/dir2/file to the system, composed the ACL, and granted write/read access to the file only to certain users. How does the system guarantee that the specified users would have the given access and the rest would not?

In order to obtain the access, the users must have read access to all directories on the path to the given file (see section 4.2.10).

As shown in sections 4.2.6-4.2.8, if the user does not have the write privilege to the directory containing the file, then the authorization to read/write by known FID and ACL is necessary and sufficient to carry out the reading/writing operations;

The authorization for access to the file is contained in the ACL. The authenticity of the ACL for the file is guaranteed by the EDS in the directory (/dir1/dir2) containing the given file.

Authenticity of the key for checking the EDS of the directory /dir1/dir2 is guaranteed by the fact that this key is contained in the ACL for the directory /dir1/dir2. Since the user does not have the write privilege to the directory he does not know the key necessary to generate the EDS;

The ACL for the directory /dir1/dir2 is contained in the directory /dir1.

The authenticity of this ACL is guaranteed by means of EDS in the directory /dir1;

Authenticity of the key for verifying the EDS in the directory /dir1 is guaranteed in that the given key is contained in the ACL for /dir2;

The ACL for /dir1 is contained in the root directory file. The authenticity of the ACL is guaranteed by means of EDS on the root directory;

The key $Vk_{RootDir}$ for verifying the EDS in the root directory is predefined and cannot be changed.

The system therefore guarantees enforcement of user's rules relating to file access. The users who have the write privilege to the directory (/dir1/dir2), where the given file is located, can change the ACL for the file and give the write access/read access to the file to other users (see sections 4.2.13-4.2.14). In addition, the file can be deleted by the users who have write privilege to the directory containing the given file.

4.2.19 Authentication of the Users of the System

In order to give to a certain user the right to access the information stored in the system, his identifier and public key for encrypting should be known. A problem arises in how to map identifiers and public keys of the users. In principle, one can use any public key infrastructure (PKI) for this purpose. As an option, one can store the certificates of the users in the system itself, that is, to make a tree of directories that coincides, for example, with the DN (distinguished names) structure in X.509 certificates. (See ITU-T Recommendation X.509 (2000) 1 ISO/IEC 9594-8:2001, Information technology—Open Systems Interconnection—The Directory: Public-key and attribute certificate frameworks).

4.2.20 Protection of Private Information

Section 4.1.4 can be implemented by encrypting information to be exchanged between the system nodes and proxy requests: upon receiving a request, the node of the system sends it farther as if in its own name. Thus, to analyze the information requested by the user in the system, an illegal intruder can do it only by introducing his own node to the system so that the user's computer would be connected to the intruder's node. Nevertheless, the analysis of requests sent to the system by the user would be handicapped in this case as well, since the node of the user can proxy the requests of other nodes.

4.2.21 Untraceability

Implementation of section 4.1.5 can be done by encryption of the information exchanged by the nodes and proxying messages in the system. As in the previous section, in order to analyze the information and define who is sending it or to trace where it is stored, the illegal intruder needs to introduce his nodes to the system. Taking into account that in the first case, it is unknown where the nodes requesting the information are located, and in the second case it is unknown where the information is stored (given that a large number of nodes exist because of redundant storage of the information in the system), the intruder would have to introduce enough of his own nodes, which is difficult with a large number of nodes in the system.

5.0 ACCESS CONTROL WITH CHANGE LOGS

Figure 7:
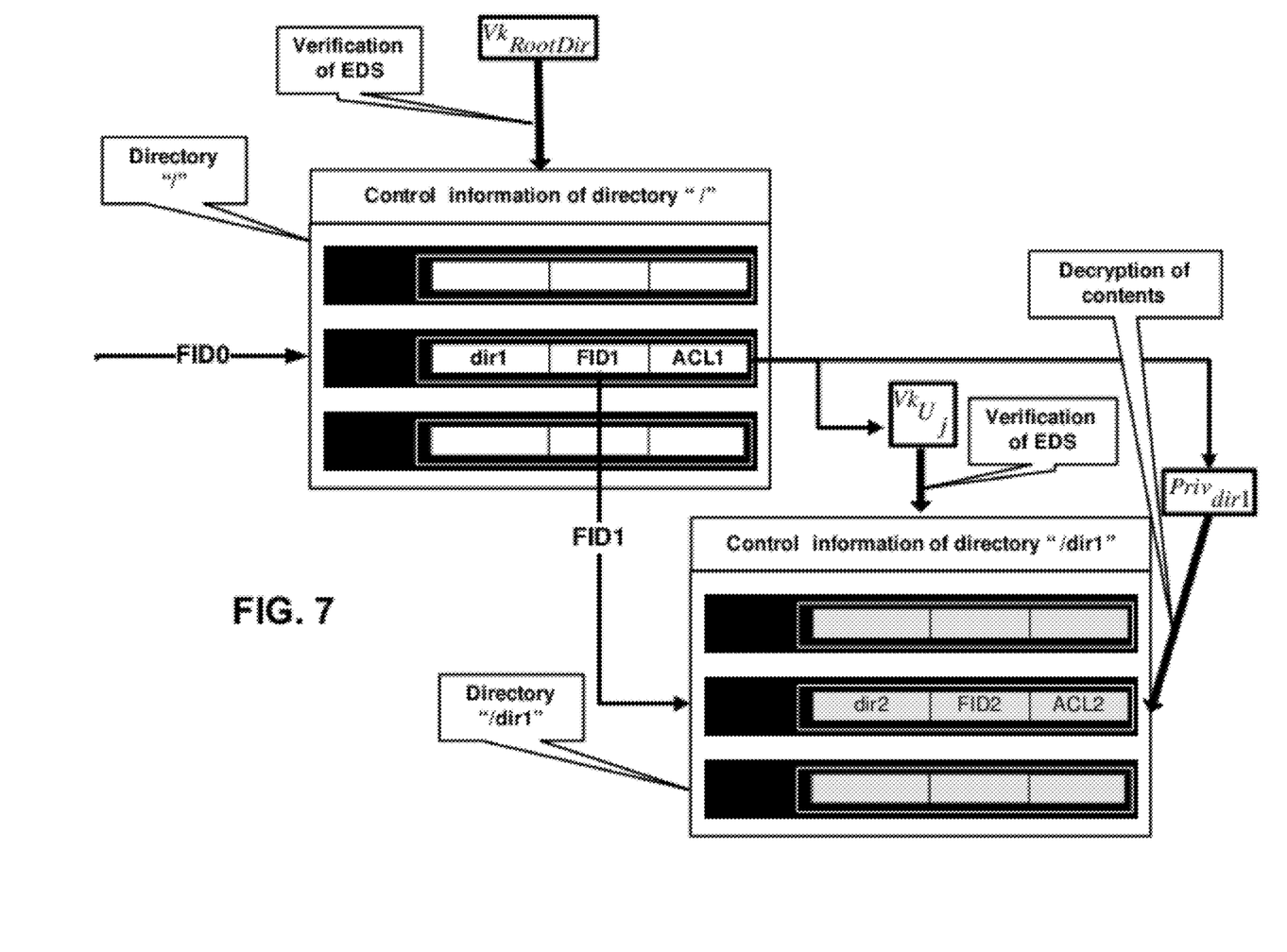
FIG. 7 shows how directory read and write access fits into the access control scheme that uses change logs.

FIG. 7 shows how directory read and write access fits into the access control scheme that uses change logs. In the access control scheme with change logs, to access each file, only a single pair of public key-secret key is used, namely for encrypting and decrypting of the file. The EDS is generated with the help of the user's secret key. At the same time, the ACL of the file contains a list of identifiers of the users who are permitted to write to this file. To verify the EDS for a particular version of the file, it is necessary to know the identifier of the user who created the EDS—therefore, a log of changing the content of the file can be created, since each alteration or modification of the file carries within it an identifier of the user who performed the alteration or modification of the data.

If the user $U_i$ is given the read access a file F, then the ACL for the file F includes an element $$R_{U_i} = \left(U_i | E_{Pub_{U_i}}^{asymm}(Priv_F)\right),$$

and if the user has write access to the file F, then the ACL for the file has an element $$W_{U_i} = \left(U_i | E_{Pub_{U_i}}^{asymm}(Pub_F)\right)$$

The ACL therefore contains a list of users who have read and/or write access to the file:

$$ACL_F = ((R_{U_{i1}} | R_{U_{i2}} | \ldots | R_{I_{ir}}) | (W_{U_{j1}} | W_{U_{j2}} | W_{U_{jw}}))$$

$ACL_F$ in this scheme, as well as in the "anonymous" scheme, is stored in the directory entry that corresponds to the file F:

$$DirEntry_F = (FileName_F | FID_F | ACL_F)$$

The zeroth block of the file F is now signed by the secret key $Sk_{U_j}$ of the user $U_j$:

$$B_{i_0} = \big(FID|TID|(i_1|h_1)|(i_2|h_2)| \cdots \\ \cdots |(i_z | h_z)\big|Sign_{Sk_{U_j}}(FID | TID|(i_1 | h_1)|(i_2 | h_2)| \cdots |(i_z | h_z))\big)$$

As may be seen from the above, these changes, compared to the "anonymous" access control scheme, permit logging of changes of file contents of the file system. Each such file change (transaction) has a corresponding zeroth block, which is signed by the user who performed this transaction.

For the file access control scheme with change logs, it is straightforward to prove the assertions shown in this section, in the above paragraphs.

6.0 ACCESS CONTROL SCHEME THAT INCLUDES AN "OWNER"

The schemes proposed above do not have a concept of an owner associated with the file—there is only a list of those who have read and write access rights to the file. In an abstract sense, the "owner" of the file is its creator, who also created the ACL for that file. This section proposes an access control scheme that explicitly includes a concept of an owner of a file. This access control scheme is based on the change logs scheme discussed above.

The access control list can be stored not in the directory entry that corresponds to the file F, but as a separate file of a special type. The directory entry contains filename $FileName_F$, identifier of the owner $U_{owner}$, identifier $FID_F$ of the file F and identifier $F/D_{ACL}$ of the file containing the ACL of the file F:

$$DirEntry_F = (FileName_F | FID_F | U_{owner} | FID_{ACL}).$$

The list of those who have permission to read and write to the file F has corresponding elements of the owner of the file $U_{owner}$:

$$ACL_F = ((R_{U_{owner}} | R_{U_{i1}} | R_{U_{i2}} | \ldots | R_{I_{ir}}) | \\ (W_{u_{owner}} | W_{U_{j1}} | W_{U_{j2}} | W_{U_{jw}}))$$

$R_U$ and $W_U$ have a structure that exactly corresponds to the structure of the corresponding elements in the access scheme with change logs.

The zeroth block of the file's ACL is signed by the key $Sk_u$ of owner the file owner:

$$B_{i_0} = \big(FID_{ACL}|TID_{ACL}|(i_1|h_1)|(i_2|h_2)| \cdots \\ \cdots |(i_z | h_z)|Sign_{Sk_{U_{owner}}}(FID_{ACL}|TID_{ACL}|(i_1 | h_1) | (i_2 | h_2)| \cdots |(i_z | h_z))\big)$$

This access control scheme corresponds to standard discretionary models of access control. Furthermore, it permits specifying a single ACL for different files and directories, which is frequently convenient and helps reduce overhead associated with access control.

The following assertions can be shown to be true:

(A) For a user to read the contents of the file, it is necessary and sufficient for the user to have read access to that file.

(B) Read access does not give the user write access.

(C) If the user does not have write access to the directory that contains the file, and he is not the owner of the file, then, in order to create a valid version of the file, it is necessary and sufficient to have write access to that file.

(D) If the user does not have write access to the directory that contains the file, and he is not the owner of the file, then read access does not result in write access to that file.

(E) Given unchanged keys ($Pub_F$/$Priv_F$), in order to give to another user read access to a file, it is necessary and sufficient to be the owner of that file.

(E) In order to give to another user write access to a file, it is necessary and sufficient to be the owner of a file or have write access to the directory that contains the file.

The ACL can be analogously "separated" from the directory entry in the anonymous model:

$$DirEntry_F = (FileName_F | FID_F | Vk_{owner_F} | FID_{ACL}),$$

$$ACL_F = \big(E_{Pub_{U_{owner}}}^{asymm}(Sk_{owner_F})|Vk_F|(R_{U_{owner}}|R_{U_{i1}}|R_{U_{i2}}|\cdots \\ \cdots |R_{U_{ir}})|(W_{U_{owner}}|W_{U_{j1}}|W_{U_{j2}}|\cdots|W_{U_{jw}})\big)$$

This introduces another pair of keys ($Sk_{owner_F}$/$Vk_{owner_F}$) used for generation/verification of the EDS in the ACL. From the perspective of maintaining anonymity, the addition of a concept of an owner is probably not very useful, but from the perspective of repeatedly using the same ACL with multiple files and/or directories, this can be justified.

7.0 CONCLUSION

An access control system for a distributed system of data storage where there is no central authorization, is described. The system belongs to a class of discretionary systems of access control. In the access control system, there is no need for security of servers and of remote systems. The only requirement is the security of clients, that is, of local computers of the users. Client software is received from trusted source unmodified and this fact can be verified ("trusted client' software"). Implementation of built-in infrastructure of public keys (PKI) is also possible. By observing certain conditions the confidentiality, authenticity and access to the stored information is guaranteed.

Having thus described a preferred embodiment, it should be apparent to those skilled in the art that certain advantages of the described system, method and apparatus have been achieved. It should also be appreciated that various modifications, adaptations, and alternative embodiments thereof may be made within the scope and spirit of the present invention.

What is claimed is:

1. A system for secure distributed data storage that uses a network, the system comprising:
  a processor;
  a memory operatively coupled to the processor;
  computer code in the memory for implementing the following functionality:
  a file stored on a plurality of storage elements that are accessible over the network; and
  an access control list associated with the file;
  a list of users, stored in the access control list, with read access to plaintext contents of the file;
  a list of users, stored in the access control list, with write access to the file;
  each user having a user public key;
  each user having a user private key;
  a file public key associated with the file and used for encrypting the plaintext contents of the file; and
  a file private key associated with the file and used for decrypting the file into the plaintext contents,
  wherein the user public key is used to encrypt the file private key, and the encrypted private file key is stored in the access control list,
  wherein the user private key is used to decrypt the encrypted private file key, and
  wherein data representing the ciphertext contents of the file, metadata associated with the file, data related to functioning of distributed data storage and the ciphertext access control list is available to any user of the network.

2. The system of claim 1, wherein the access control list further comprises a list of users with access control list modification rights.

3. The system of claim 1, wherein access control policy to the plaintext contents of the file is enforced on the client side.

4. The system of claim 1, wherein any of: the file, file metadata, file system-related data and network metadata, is stored in an encrypted form.

5. The system of claim 1, wherein any of: the file, file metadata, file system-related data and network metadata, is stored in a signed form.

6. The system of claim 1, wherein the file has multiple revisions.

7. The system of claim 6, wherein at least two of the revisions have different encryption and decryption keys.

8. The system of claim 6, wherein every revision has the same encryption and decryption key.

9. The system of claim 1, further comprising a directory in which at least one of the following is stored:
  a path to storage elements associated with the file;
  a file identifier;
  the access control list;
  a file's symbolic name associated with the directory and with the file identifier; file metadata; and
  file history data,
  wherein data representing the directory is available to users of the network.

10. The system of claim 9, wherein the directory is stored in encrypted form.

11. The system of claim 9, wherein the directory content in plaintext form is available only to users with read access.

12. The system of claim 9, wherein separate entries in the directory have their own access control lists.

13. The system of claim 9, wherein a path to the directory is provided to users of the network.

14. The system of claim 9, wherein an owner identifier of the file is stored in the directory, and wherein the owner identifier identifies a user who can change the access control list.

15. The system of claim 14, wherein the file has more than one owner identifier.

16. The system of claim 9, wherein the directory is treated as if it were a file, for purposes of encryption, digital signature generation and verification.

17. The system of claim 1, wherein the network is a peer-to-peer network.

18. The system of claim 1, wherein all users of the network have access to ciphertext content of the file,
  have access to the ciphertext access control list, and
  have access to one of:
  a path to storage elements associated with the file;
  a file identifier;
  a file's symbolic name associated with the directory and with the file identifier; and
  file metadata.

19. The system of claim 1, wherein write access includes any of write-once access, and write-many-times access.

20. The system of claim 1, wherein the access control list includes a list of users with modification rights to a file containing the access control list.

21. The system of claim 1, wherein the access control list is encrypted.

22. The system of claim 1, wherein access to the plaintext contents of the access control list is restricted.

23. The system of claim 1, further comprising a signature private key associated with the file and used to generate a digital signature for write access to the file; and
  a signature public key associated with the file and used to verify the digital signature of the file.

24. The system of claim 1, further comprising a signature private key associated with each user and used for generating a digital signature for write access to the file; and
  a signature public key associated with each user and used for verifying the digital signature.

25. The system of claim 1, wherein encrypting the plaintext contents of the file further comprises:
  (a) generating a session key, which is a temporary key for symmetrical encryption;
  (b) encrypting the file contents into ciphertext using the session key;
  (c) encrypting the session key using the file public key; and
  (d) attaching the encrypted session key to the ciphertext contents of the file.

26. The system of claim 1, wherein all users of the network have access to file history data.

27. A computer-implemented method for secure distributed data storage that uses a network, the method comprising:
  storing a file on a plurality of hardware storage elements that are accessible over the network; and
  generating an access control list associated with the file;
  storing, in the access control list, a list of users with read access to plaintext contents of the file;
  storing, in the access control list, a list of users with write access to the file;

for each user, generating a user public key used for encrypting information for accessing the plaintext contents of the file;

for each user, generating a user private key used for decrypting the information for accessing the plaintext contents of the file;

generating a file public key associated with the file and used for encrypting the plaintext contents of the file;

generating a file private key associated with the file and used for decrypting the file into the plaintext contents;

wherein the user public key is used to encrypt the file private key, and the encrypted private file key is stored in the access control list, wherein the user private key is used to decrypt the encrypted private file key, and wherein data representing the ciphertext contents of the file, metadata associated with the file, data related to functioning of distributed data storage and the ciphertext access control list is available to any user of the network.

28. The method of claim 27, wherein the method utilizes a directory in which at least one of the following is stored:
 a path to storage elements associated with the file;
 a file identifier;
 the access control list;
 a file's symbolic name associated with the directory and with the file identifier; file metadata; and
 file history data,
 wherein data representing the directory is available to users of the network, and
 wherein the directory is treated as if it were a file, for purposes of encryption, digital signature generation and verification.

29. The method of claim 27, wherein the method utilizes a directory in which a file identifier corresponding to the file, a public key for verifying a digital signature for the access control list, and a file identifier corresponding to a file that contains the access control list are stored.

30. The method of claim 27, further comprising:
 (a) generating a signature private key associated with the file and used to generate a digital signature for write access to the file; and
 (b) generating a signature public key associated with the file and used to verify the digital signature of the file.

31. The method of claim 27, further comprising generating a signature private key associated with each user and used for generating a digital signature for write access to the file; and
 generating a signature public key associated with each user and used for verifying the digital signature.

32. The method of claim 27, wherein encrypting the plaintext contents of the file further comprises:
 (a) generating a session key, which is a temporary key for symmetrical encryption;
 (b) encrypting the file contents into ciphertext using the session key;
 (c) encrypting the session key using the file public key; and
 (d) attaching the encrypted session key to the ciphertext contents of the file.

33. A system for secure distributed data storage that uses a network, the system comprising:
 a processor;
 a memory operatively coupled to the processor;
 computer code in the memory for implementing the following functionality:
 a file stored on a plurality of storage elements that are accessible over the network;
 an access control list associated with the file;
 a list of users, stored in the access control list, with write access to the file;
 each user having a user public key and a user private key;
 a file public key used for encrypting the file; and
 a file private key used for decrypting the file,
 wherein the user public key is used to encrypt the file private key, and the encrypted private file key is stored in the access control list,
 wherein the user private key is used to decrypt the encrypted private file key, and
 wherein the encrypted file, metadata associated with the file, and the encrypted access control list is available to users of the network.

\* \* \* \* \*